(12) United States Patent
Smith

(10) Patent No.: US 6,973,429 B2
(45) Date of Patent: Dec. 6, 2005

(54) GRAMMAR GENERATION FOR VOICE-BASED SEARCHES

(75) Inventor: Kenneth Smith, Bellevue, WA (US)

(73) Assignee: A9.com, Inc., Palo Alto, CA (US)

( * ) Notice: Subject to any disclaimer, the term of this patent is extended or adjusted under 35 U.S.C. 154(b) by 594 days.

(21) Appl. No.: 09/729,646

(22) Filed: Dec. 4, 2000

(65) Prior Publication Data

US 2002/0069059 A1 Jun. 6, 2002

(51) Int. Cl.$^7$ .............................................. G10L 15/18
(52) U.S. Cl. .................... 704/257; 704/270.1; 704/245
(58) Field of Search ........................... 704/257, 270.1, 704/9, 245, 2, 260; 707/4

(56) References Cited

U.S. PATENT DOCUMENTS

| | | | |
|---|---|---|---|
| 5,265,065 A | * | 11/1993 | Turtle ............................. 707/4 |
| 5,452,397 A | | 9/1995 | Ittycheriah et al. |
| 5,500,920 A | | 3/1996 | Kupiec |
| 5,519,608 A | | 5/1996 | Kupiec |
| 5,634,084 A | * | 5/1997 | Malsheen et al. ........... 704/260 |
| 5,696,962 A | | 12/1997 | Kupiec |
| 5,758,322 A | | 5/1998 | Rongley |
| 5,774,628 A | | 6/1998 | Hemphill |
| 5,832,428 A | | 11/1998 | Chow et al. |
| 5,917,889 A | | 6/1999 | Brotman et al. |
| 5,917,944 A | | 6/1999 | Wakisaka et al. |
| 6,014,624 A | | 1/2000 | Raman |
| 6,061,654 A | | 5/2000 | Brown et al. |
| 6,073,100 A | | 6/2000 | Goodridge, Jr. |
| 6,137,863 A | | 10/2000 | Brown et al. |
| 6,144,938 A | | 11/2000 | Surace et al. |
| 6,148,105 A | | 11/2000 | Wakisaka et al. |
| 6,188,985 B1 | | 2/2001 | Thrift et al. |
| 6,278,967 B1 | * | 8/2001 | Akers et al. .................... 704/2 |
| 6,282,512 B1 | | 8/2001 | Hemphill |
| 6,308,157 B1 | | 10/2001 | Vanbuskirk et al. |
| 6,311,182 B1 | | 10/2001 | Colbath et al. |
| 6,324,513 B1 | | 11/2001 | Nagai et al. |
| 6,334,103 B1 | | 12/2001 | Surace et al. |
| 6,434,524 B1 | | 8/2002 | Weber |
| 6,456,974 B1 | | 9/2002 | Baker et al. |
| 6,604,075 B1 | * | 8/2003 | Brown et al. ............. 704/270.1 |
| 6,615,172 B1 | * | 9/2003 | Bennett et al. ............. 704/257 |
| 2001/0034603 A1 | | 10/2001 | Thrift et al. |

FOREIGN PATENT DOCUMENTS

| WO | WO 00/14729 | 3/2000 |
|---|---|---|

* cited by examiner

Primary Examiner—Susan McFadden
Assistant Examiner—Huyen X. Vo
(74) Attorney, Agent, or Firm—Knobbe, Martens, Olson & Bear LLP

(57) ABSTRACT

A grammar generation process generates a speech recognition grammar for interpreting search queries or a domain of items. The grammar comprises both single-term and multi-term utterances derived from the texts of the items (preferably the item titles). The utterances are derived in-part by expanding phrases selected from the item text into their individual terms plus all forward combinations of such terms. The forward combinations and individual terms that are deemed not useful to the search process are filtered out of the grammar. The process tends to produce a grammar containing the utterances that are most likely to occur within voice queries for the items, while maintaining a grammar size that is sufficiently small to provide reliable speech recognition.

18 Claims, 4 Drawing Sheets

GRAMMAR GENERATION FOR VOICE-BASED SEARCHES

BACKGROUND OF THE INVENTION

1. Field of the Invention

The present invention relates to speech recognition stems, and more particularly, relates to methods for recognizing utterances when a user performs a voice-based search.

2. Description of the Related Art

With the increasing popularity of wireless devices, many Web site operators and other content providers are deploying voice driven interfaces ("voice interfaces") for allowing users to browse their content. The voice interfaces commonly include "grammars" that define the valid utterances (terms, phrases, etc.) that can occur at a given state within a browsing session. The grammars are fed to a speech recognition system and are used to interpret the user's voice entry. In Web-based systems, the grammars are typically embedded as text files within voiceXML versions of Web pages. To support the use of multiple-term utterances, the grammar may include common phrases (ordered combinations of two or more terms).

One problem with speech recognition systems is that the reliability of the recognition process tends to be inversely proportional to the size of the grammar. This poses a significant problem to content providers wishing to place large databases of products or other items online in a voice-searchable form. For example, if all or even a significant portion of the possible word combinations are included in the grammar as phrases, the grammar would likely become far too large to provide reliable speech recognition. If, on the other hand, commonly used terms and/or phrases are omitted from the grammar, the system may be incapable of recognizing common voice queries. The present invention seeks to address this problem.

SUMMARY OF THE INVENTION

The present invention provides a system and associated methods for generating a speech recognition grammar for interpreting voice queries of a database or other domain of items. The items may, for example, be book titles, movie titles, CD titles, songs, television shows, video games, toys, published articles, businesses, Web pages, users and/or any other type of object for which text-based searches are conducted. The invention is particularly well suited for conducting voice-based title searches. (As used herein, a "title search" is a field-restricted search in which items are located using terms appearing within item titles.)

In accordance with the invention, phrases are extracted from the searchable representations of the items, and are processed to identify (predict) the utterances that are most likely to occur within queries for such items. The phrases may, for example, include or be extracted from the titles of the items (e.g., to generate a grammar for interpreting voice-based title searches). Individual terms (e.g., single-term titles), may also be extracted from the items.

To identify the most likely utterances, each extracted phrase is exploded into its individual terms plus all forward combinations of such terms (i.e., ordered sets of two or more consecutive terms). For example, the phrase "The red house" would produce the following utterances: "the," "red," "house," "the red," "red house," and "the red house." To avoid an undesirably large number of forward combinations, the extracted phrases may be limited in size to a certain number of terms. For example, if the grammar is derived from the titles of the items, a title having more than N terms (e.g., six terms) may be subdivided into two or more smaller phrases before phrase explosion.

A set of heuristics is applied to the resulting utterances to (a) remove utterances that are deemed unhelpful to the searching process (e.g., duplicate utterances, and utterances that would produce too many "hits"), and (b) to translate certain utterances into a format more suitable for use by the speech recognition system. The remaining single-term and multiple-term utterances are combined to form the speech recognition grammar. A relatively small set of "canned" utterances may also be inserted. The grammar thus contains single-term and multiple-term utterances derived from the items, with the multiple-term utterances consisting essentially, or at least primarily, of forward combinations generated from the extracted phrases. The grammar is provided to a conventional speech recognition engine that is used to interpret voice queries for the items. The process of generating the grammar may be repeated as needed to maintain a grammar that is consistent with the contents of the database. Further, different grammars may be generated for different sets or domains of items.

An important aspect of the invention is that the resulting grammar tends to contain the terms and phrases most likely to be used within queries for the items, yet tends to be sufficiently small in size (even when the domain of items is large) to enable reliable speech recognition.

BRIEF DESCRIPTION OF THE DRAWINGS

These and other features will now be described with reference to the drawings summarized below. These drawings and the associated description are provided to illustrate preferred embodiments of the invention, and not to limit the scope of the invention.

DETAILED DESCRIPTION OF A PREFERRED EMBODIMENT

For purposes of illustrating one particular application for the invention, a particular embodiment will now be described in which speech recognition grammars are generated for interpreting voice-based searches, and preferably voice-based title searches, for products represented within a database (e.g., book, music, and/or video products). It will be recognized, however, that the invention may also be used for conducting searches for other types of items, such as Web pages indexed by a crawler, downloadable software, companies, chat rooms, court opinions, telephone numbers, and other users. In addition, the invention may be used in the context of searches other than title searches, including but not limited to non-field-restricted searches, field-restricted searches corresponding to other database fields, and natural language searches.

In the context of the preferred embodiment, each item (product) is represented in the database as a record containing multiple fields, each of which contains a particular type of data (e.g., author, title, subject, description, etc.). The term "item" will be used generally to refer both to the products themselves and to the database records for such products. The term "title" will be used to refer generally to a name of a product such as the name of a book, CD, movie, song, article, toy, or electronics device.

Figure 1:
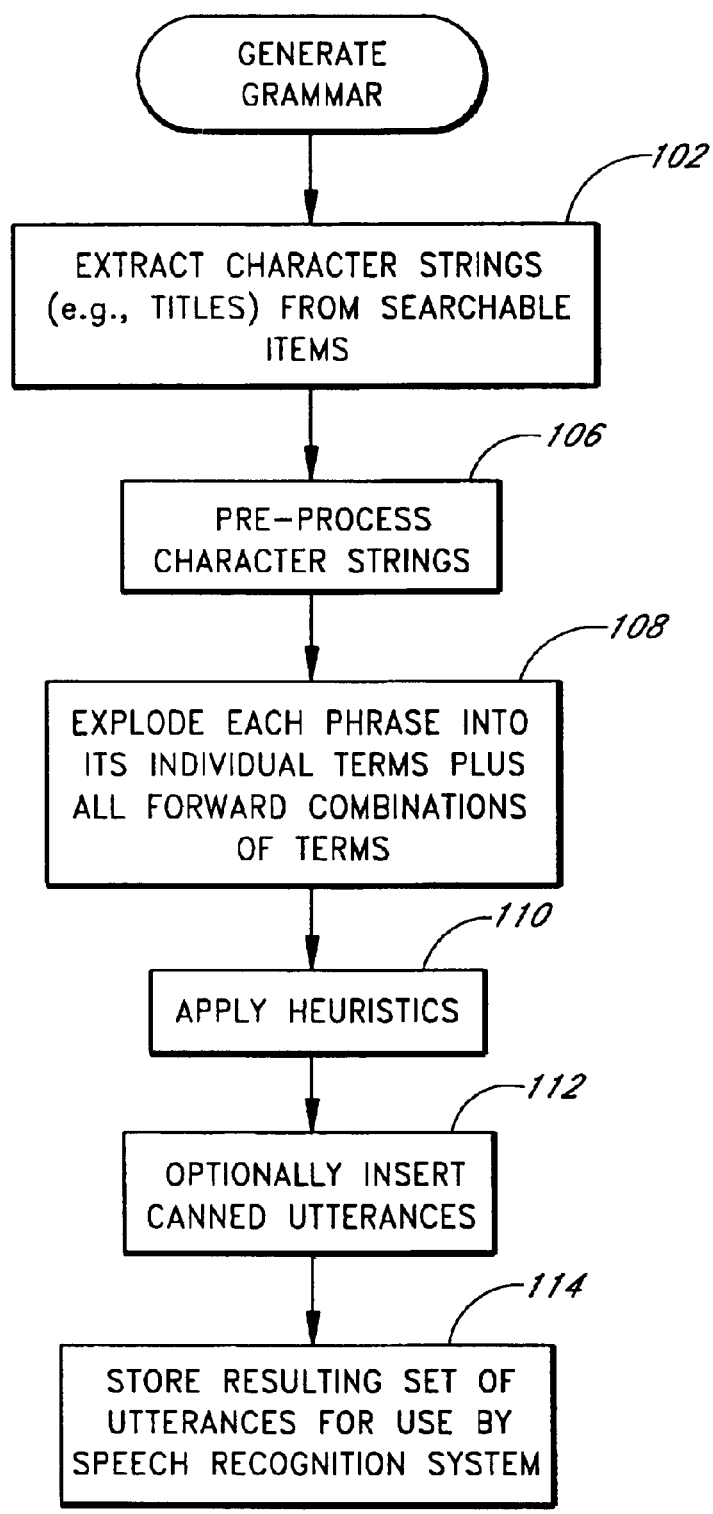
FIG. 1 illustrates a process for generating grammars for use in voice based searches.

FIG. 1 illustrates the general process used in the preferred embodiment to generate a grammar for interpreting voice queries. The process may be executed as needed (e.g., once per week, when new items are added to the database, etc.) to ensure that the current grammar corresponds closely to the current contents of the database. Different grammars may be generated for different categories of items (e.g., books versus movies) to support category-specific searches. A more specific implementation of the FIG. 1 process is discussed separately below with reference to FIG. 4.

As depicted in FIG. 1, the first step 102 of the process involves extracting or copying character strings from the text of the items in the searchable domain. These character strings necessarily include phrases (ordered combinations of two or more terms), and may include individual terms. Preferably, this step is performed by extracting the item titles in the searchable domain, and the resulting grammar is used to interpret voice-based title searches. For example, to generate a grammar for interpreting title searches for books, the title of each book in the database would be read. As will be recognized, the character strings could alternatively be extracted from other fields or portions of the searchable items to support other types of searches. For example, the strings could include or consist of one or more of the following: (1) complete sentences extracted from reviews of other descriptions of the items, (2) headings or sub-titles extracted from item text, (3) phrases determined by a text-processing algorithm to be characterizing of the respective items, and (4) phrases which appear in bold or other highlighted item text. The extracted character strings are stored in a file or other data structure which, following completion of the process, represents the speech recognition grammar.

As depicted by steps 104 and 106, each character string (typically a phrase) is preferably preprocessed before the other process steps are performed. For example, phrases that exceed a predefined number of terms may be subdivided into smaller phrases (to avoid large numbers of forward combinations in step 108), and symbols and abbreviations may be converted to their word equivalents. An example set of pre-processing operations is discussed below with reference to FIG. 4.

In step 108, each phrase is expanded or exploded into a set consisting of (a) all terms of the phrase (individually), and (b) all forward combinations, where a forward combination is defined as an ordered group of two or more consecutive terms of the phrase. For example, the phrase "the red house" would be expanded into the following set of character strings:
the
red
house
the red
red house
the red house
If the original character string had been divided into sub-phrases during preprocessing (step 106), the explosion step 108 is applied separately to each sub-phrase. The explosion step has no effect on any single-term character strings extracted in step 102.

After the explosion step 108 has been applied to all phrases, a preliminary version of the grammar exists. This preliminary grammar consists of both single-term and multi-term character strings, each of which represents an utterance that may be included in the final grammar. As depicted by step 110, a set of heuristics is applied to the entries within this preliminary grammar to (a) remove utterances that are deemed unhelpful to the searching process (e.g., duplicate utterances, and utterances that would produce too many "hits"), and (b) to translate certain utterances into a format more suitable for use by the speech recognition system. A preferred set of heuristics for use in generating a title search grammar is described below with reference to FIG. 4.

Finally, as illustrated by step 112, a small set of canned utterances may optionally be added to the grammar to handle special situations. The resulting set of utterances is then appropriately sorted (not shown), and is stored as a grammar file (step 114) for use by a speech recognition system.

An important characteristic of the resulting grammar is that the phrases contained within the grammar consist essentially, or at least primarily, of selected forward combinations of terms derived from the titles or other extracted phrases. Other combinations of terms are omitted from the grammar. For example, for the book title "Into Thin Air," the non-forward-combinations "air into," "thin into," "air thin," and "air thin into" would not be added to the grammar. Because users tend to utter only individual terms or forward combinations of terms when conducting voice searches, the process captures the terms and phrases that are most likely to be used. Further, because other phrases are generally omitted, the grammar tends to be sufficiently small to provide reliable speech recognition—even when the number of items in the searchable domain is large (e.g., hundreds of thousands or millions). Other processing methods that produce a grammar having such attributes are within the scope of the invention.

Figure 2:
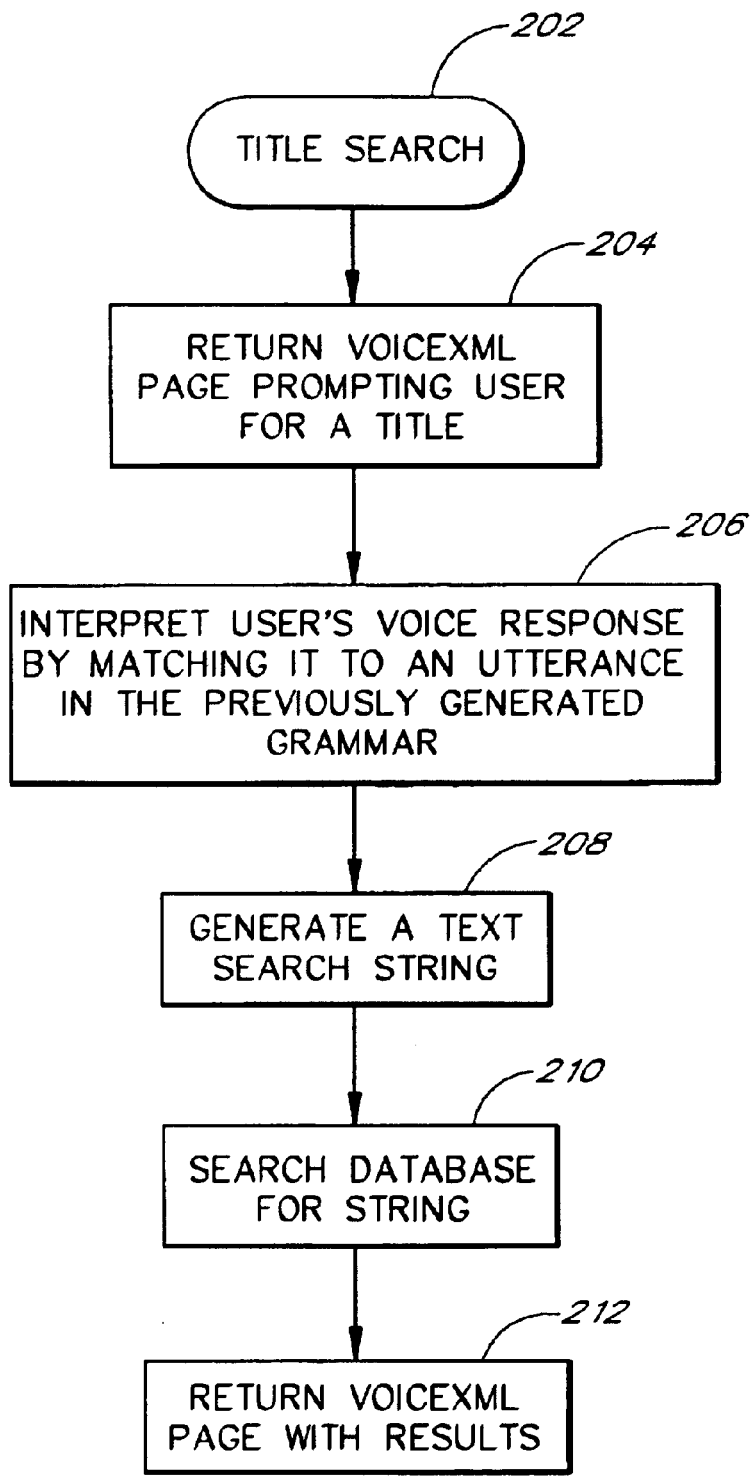
FIG. 2 illustrates a process for performing a voice-based title search of a database.

FIG. 2 illustrates how the resulting grammar may be used to process a voice-based title search using voiceXML pages. This process may be implemented through executable code and associated content of a Web site or other system that provides voice searching capabilities. A conventional automated speech recognition (ASR) system that interprets voice according to externally supplied grammars may be used to implement the speech recognition tasks.

As depicted by FIG. 2, after the user selects a title search option (step 202), the user is prompted (typically by voice, but optionally by text) to utter all or a portion of a title. For example, if the user is searching for the title "Disney's, the Hunchback of Notre Dame," the user could say "Hunchback of Notre Dame." The voice prompt, and the corresponding grammar for interpreting the user's query, may be specified within a voiceXML page provided to the ASR system using well-known methods.

As illustrated by steps 206 and 208, the ASR system interprets the user's voice query by attempting to match it to an utterance contained within the grammar, and if a match is found translates the voice utterance into a corresponding text query. The text query may optionally include Boolean operators (e.g., the query terms may be explicitly ANDed together). In step 210 and 212, the text query is used by a conventional search engine to search a database of items, and the search results are returned to the ASR system (for audible output to the user) within a voiceXML page.

Figure 3:
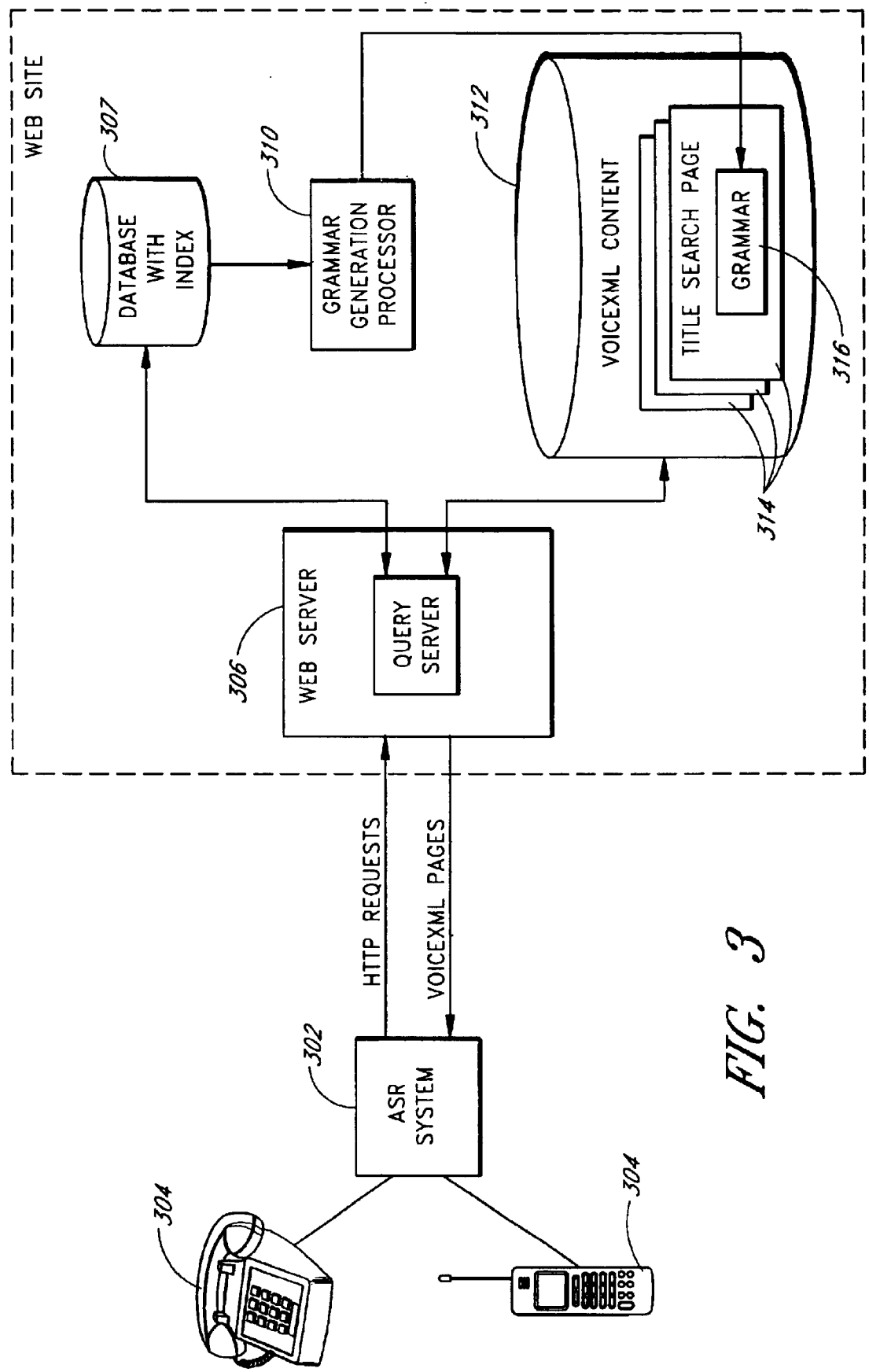
FIG. 3 illustrates a Web-based system in which the invention may be embodied.

FIG. 3 illustrates a typical Web site system in which the invention may be embodied, and shows some of the components that may be added to the system to implement the invention. In this system, users can browse the Web site using either a conventional web browser (not shown) or using the site's voice interface. Users of the voice interface connect to the site by establishing a telephone connection to a conventional ASR system 302 from a mobile or landline telephone 304 (or other device that supports the use of voice). The ASR system 302 may, but need not, be local to the web server 306. Although the illustrated system uses voiceXML to provide the voice interface, it will be recognized that the invention is not so limited.

Figure 4:
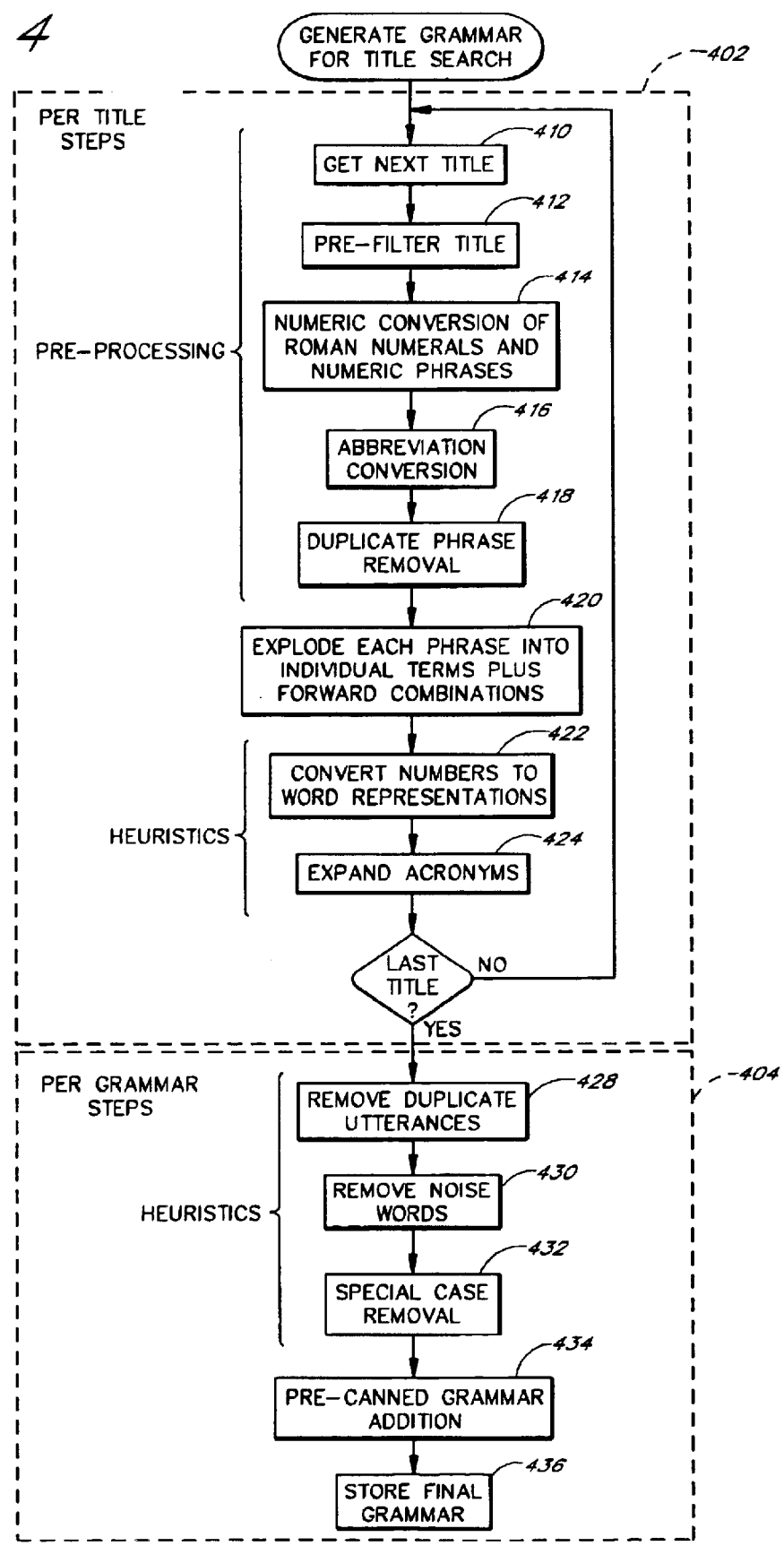
FIG. 4 illustrates an example implementation of the FIG. 1 process for generating a title search grammar.

As depicted by FIG. 3, the system includes an indexed database 307 of the works or other items for which searches may be conducted. A grammar generation processor 310 accesses this database 307 to generate grammars according to the process of FIG. 1, a specific implementation of which is shown in FIG. 4 for performing title searches. The grammar generation processor 310 is preferably implemented within software executed by a general-purpose computer system, but could alternatively be implemented within special hardware. Each grammar 316 is preferably stored as part of a title search page 314 that is passed to the ASR system when a title search is initiated. As illustrated, a separate title search page 314 and grammar 316 may be provided for each category of items that is separately searchable (e.g., books, music, and videos). The title search pages 314 are stored within a repository of voiceXML content 312.

When a user submits a voice-based title search from a telephone 304 or other device, the ASR system attempts to match the user's utterance to a textual utterance contained within the relevant grammar 316. If no match is found, the ASR system may output an audible error message to the user, or may simply fail to respond. If a match is found, the ASR system translates the voice query into an HTTP request specifying the user's query. The Web server 306 processes the request by invoking a query server 320 to search the database 307, and then returns to the ASR system a voiceXML page specifying the search results. The search results may then be output in audible or other form to the user.

FIG. 4 illustrates a particular implementation of the FIG. 1 process as applied to item titles. The process consists of two stages: a per title stage 402 and a per grammar stage 404. In the illustrated embodiment, the process performs the per title steps 402 on each title while writing results to a grammar file, and then performs the per grammar steps 404 on the resulting grammar file. The output of the process is used to interpret voice-based title searches. As will be apparent, the specific rules applied within these steps may be varied to accommodate the particular search context (e.g., item category, number of items, etc.) for which the grammar is being generated.

A. Per Title Steps

The following is a description of the per-title steps.

In the pre-filtering step 412, symbols such as "&" and "+" are converted to their word equivalents ("and" and "plus" in this example). In addition, punctuation is removed from the title, and all terms are converted to lowercase. Further, predefined phrases that are deemed unlikely to be used within queries may be filtered out of the title.

Another pre-filtering operation that may be performed is to subdivide long titles into shorter phrases. For example, any title having more than six terms may be subdivided into phrases of no more than six terms. One method for dividing the titles involves using a language-processing algorithm to attempt to extract sub-phrases that each contain a noun, a verb, and an adjective. Each sub-phrase is thereafter processed via steps 414–425 as if it were a separate title.

In the numeric conversion step 414, Roman numerals and numeric phrases are converted into corresponding word representations. For example, the character string "$21^{st}$" would be converted to the phrase "twenty first," and the string "XV" would be converted to "fifteen." Standard numbers preferably are not converted to word representations at this point, but rather are so converted following the explosion step 420. For instance the string "21" would not be converted to "twenty one" in this step 414.

In the abbreviation conversion step 416, abbreviations are expanded into their term equivalents. For instance, the abbreviation "Dr." is converted to "doctor," and "Mr." is converted to "mister."

In the duplicate phrase removal step 418, any duplicate phrases are removed from the title. For instance, in the title like "Game Boy, Plastic Case, Game Boy Color, for Game Boy II," two of the three "Game Boy" phrases would be removed.

In the explosion step 420, the process explodes any phrase extracted from the title into its individual terms and forward combinations, as described above. If the title had been divided into sub-phrases, each sub-phrase is exploded separately. If the preprocessed title consists of only a single term, no explosion processing is necessary. As discussed above, the explosion step has the effect of extracting the phrases that are most likely to be used in voice queries for the title, while omitting other word combinations that are less likely to be used (e.g., for the title "The Red House," the combinations "the house" and "house red"). The output of the explosion step 420 is a list one or more utterances that may be included in the grammar to enable the particular item to be located. As discussed below, some of these utterances may be removed or modified during subsequent steps of the process.

Following the explosion step 420, standard numbers are converted to their word counterparts (step 424). For example, the number "122" would be converted to "one hundred and twenty two." This conversion step is performed after the explosion step 420 so that the explosion does not produce an unnecessarily large number of utterances. For example, during the explosion step 420, the string "122" is treated as a single term, rather than the five terms appearing in "one hundred and twenty two."

In the acronym expansion step 424, acronyms are expanded into corresponding terms and phrases. For instance, "WWF" is converted to "W W F." Further, special cases like "4×4" and "3d" are converted to "four by four" and "three dee," respectively.

In step 425, the resulting list of utterances for the current title is added to a preliminary version of the grammar. The process is then repeated until all of the titles have been processed.

B. Per Grammar Steps

The following is a description of the per-grammar steps that are applied to the preliminary version of the grammar:

In the duplicate utterances removal step 428, duplicate utterances occurring within the grammar set are removed. For instance, if the titles "Disney's Hunchback of Notre Dame" and "Memoirs of Disney's Creator" both exist within the database, the utterance "disneys" will appear at least twice within the grammar. Only a single occurrence of the utterance is retained.

In the noise word removal step 430, specific grammar entries that are deemed non-useful to the search process (e.g., would produce a large number of search results) are removed from the grammar. For instance, in one embodiment, the following types of single-term utterances are removed: (a) colors, such as "red" and "green," (b) common words such as "is," "or," "for" and "like," and (c)

numbers such as "five" and "twenty." A list of the noise words for a particular search domain can be generated automatically by identifying the terms that appear in more than a predefined threshold of titles (e.g., 20).

In the "special case removal" step 432, utterances that satisfy certain operator-defined heuristics are removed. For example, the following types of utterances may be removed: (a) utterances that end in words such as "and," "are," "but," "by," and "if," and (b) utterances containing nonsensical word patterns such as "the the," "the in," and "of for." A system operator may develop a set of heuristics that is suitable for a particular search engine and database by manual inspection of the grammars generated.

In the pre-canned grammar addition step 404, a predefined set of utterances is preferably added to the grammar. For instance, because the video game title "pokemon" is pronounced by some users as the three separate terms "pok," "ee," and "mon," it may be desirable to add these terms to the grammar as single-term utterances. Typically, only a relatively small number of utterances are added to grammar during this step.

The resulting grammar is stored as a text file or other data structure (step 436), and is provided to the ASR system (e.g., within a voiceXML page) when a user initiates a voice-based title search.

As will be apparent, the steps of the above-described process can be varied in order without affecting the resulting grammar. For example, noise word utterances (step 430) and special case utterances (step 432) could be removed during or immediately following the explosion step 420.

One variation of the above-described process is to store within the grammar structure identifiers of the titles to which the utterances correspond. The grammar would thus serve both as a speech recognition grammar and as a search engine index. In such embodiments, the ASR system 302 and the query server 320 may be combined into a single program module that uses the grammar/index structure to both interpret an utterance and look up the corresponding search results.

What is claimed is:

1. A method of specifying to a speech recognition system a set of valid utterances for interpreting voice-based queries for items within a domain of items, the method comprising:

extracting phrases from at least some of the items within the domain;

expanding each phrase into a set consisting of individual terms of the phrase and forward combinations of terms within the phrase, to thereby generate a set of utterances which includes both single-term and multiple-term utterances;

incorporating at least some of the single-term and multiple-term utterances into the speech recognition grammar; and providing the speech recognition grammar to the speech recognition system.

2. The method as defined in claim 1, wherein extracting phrases comprises extracting titles of the items.

3. The method as defined in claim 2, wherein extracting phrases further comprises dividing a title having more than a predefined number of terms into multiple phrases.

4. The method as defined in claim 2, further comprising using the speech recognition grammar and the voice recognition system to interpret of voice-based query of a title search.

5. The method as defined in claim 1, further comprising extracting individual terms from at least some of the items, and incorporating at least some of the individual terms into the grammar.

6. The method as defined in claim 1, wherein incorporating at least some of the single-term and multiple-term utterances into the speech recognition grammar comprises removing at least some of the utterances according to a set of heuristics.

7. The method as defined in claim 1, further comprising converting a number within a multiple-term utterance produced by said phrase expansion into a multiple-word counterpart.

8. The method as defined in claim 1, further comprising expanding an acronym within a multiple-term utterance produced by said phrase expansion into a multiple-term counterpart.

9. A method of enabling an item to be located by a voice-based search query, the method comprising:

extracting a phrase from text of the item;

translating the phrase into a set of utterances consisting of (a) individual terms of the phrase, and (b) all ordered combinations of two or more consecutive terms of the phrase; and storing at least some of the utterances of the set, including both single-term and multi-term utterances, within a speech recognition grammar used to interpret the voice-based search query.

10. The method as defined in claim 9, wherein extracting a phrase comprises extracting the phrase from a title of the item.

11. The method as defined in claim 9, wherein storing at least some of the utterances comprises filtering out at least one utterance according to a set of heuristics.

12. The method as defined in claim 9, further comprising removing a duplicate phrase within the title prior to translation into the set of utterances.

13. The method as defined in claim 9, further comprising converting a number within the set of utterances into a word counterpart.

14. The method as defined in claim 9, further comprising expanding an acronym within the set of utterances.

15. The method as defined in claim 9, wherein the phrase comprises at least three terms.

16. A system for conducting voice based searches within a domain of items, comprising:

a speech recognition system that interprets voice search queries from users; and a grammar which specifies to the speech recognition system valid utterances for interpreting the voice search queries, wherein the grammar comprises both single-term and multi-term utterances derived from the items within the domain, and said multi-term utterances consist primarily of forward combinations derived from phrases within text of the items, said grammar generated using a computer system that translates a phrase into a set of utterances containing (a) individual terms of the phrase, and (b) all ordered combinations of two or more consecutive terms of the phrase.

17. The system as in claim 16, wherein the forward combinations are derived from titles of the items.

18. The system as in claim 17, wherein the speech recognition system uses the grammar to interpret voice queries of title searches.

* * * * *

UNITED STATES PATENT AND TRADEMARK OFFICE
CERTIFICATE OF CORRECTION

PATENT NO. : 6,973,429 B2
DATED : December 6, 2005
INVENTOR(S) : Kenneth Smith

It is certified that error appears in the above-identified patent and that said Letters Patent is hereby corrected as shown below:

<u>Title page,</u>
Item [57], ABSTRACT,
Line 2, after "queries" replace "or" with -- of --.

<u>Column 1,</u>
Line 8, replace "stems," with -- systems, --.
Line 63, replace "The" with -- the --.

<u>Column 7,</u>
Line 62, after "interpret" replace "of" with -- a --.

<u>Column 8,</u>
Line 34, replace "claim 9," with -- claim 10, --.
Line 44, replace "voice based" with -- voice-based --.

Signed and Sealed this

Sixth Day of June, 2006

JON W. DUDAS
*Director of the United States Patent and Trademark Office*